(12) United States Patent
Wong et al.

(10) Patent No.: US 10,874,091 B2
(45) Date of Patent: Dec. 29, 2020

(54) FILTER MATERIAL FOR CULTURE SYSTEM, AND PREPARATION METHOD AND USE THEREOF

(71) Applicant: Solis High-tech Ind. (Shenzhen) Ltd., Shenzhen (CN)

(72) Inventors: Tommy Chi-Kin Wong, Shenzhen (CN); Christopher Kenneth Clevers, Shenzhen (CN); Tin-Han Chien, Shenzhen (CN)

(73) Assignee: Solis High-Tech Ind. (Shenzhen) Ltd., Shenzhen (CN)

( * ) Notice: Subject to any disclaimer, the term of this patent is extended or adjusted under 35 U.S.C. 154(b) by 0 days.

(21) Appl. No.: 16/291,600

(22) Filed: Mar. 4, 2019

(65) Prior Publication Data
US 2020/0045944 A1 Feb. 13, 2020

(30) Foreign Application Priority Data
Aug. 10, 2018 (CN) .......................... 2018 1 0908174

(51) Int. Cl.
*A01K 63/04* (2006.01)
*C02F 1/46* (2006.01)
(Continued)

(52) U.S. Cl.
CPC ........ *A01K 63/045* (2013.01); *B01D 39/2027* (2013.01); *B01D 39/2068* (2013.01);
(Continued)

(58) Field of Classification Search
CPC ...... A01K 63/045; A01K 63/04; A01K 61/00; A01K 61/10; A01K 61/80; A01K 61/85;
(Continued)

(56) References Cited

U.S. PATENT DOCUMENTS 4,048,028 A * 9/1977 Moeglich ................ C02F 1/288
205/144
8,658,035 B2 * 2/2014 Barry ........................ C02F 1/32
210/243
(Continued)

FOREIGN PATENT DOCUMENTS

CN 2564563 8/2003
CN 201286292 8/2009
(Continued)

*Primary Examiner* — Joseph W Drodge
(74) *Attorney, Agent, or Firm* — Lowenstein Sandler LLP

(57) ABSTRACT

The present invention discloses a filter material for a culture system, and a preparation method and use thereof. The filter material comprises an anode material and a cathode material, wherein the anode material is an active metal, and the cathode material is an inactive metal or a conductive nonmetal. The filter material can significantly improve the water quality in the culture system, be used for in-situ treatment of the water body in the culture system and be convenient to use. The filter material does not require additional application of voltage or current, and thus is safer. At the same time, the filter material has a long service life and does not need to be changed frequently. In addition, the preparation method of the filter material is simple, efficient, and environmentally friendly, and is advantageous for large-scale production.

16 Claims, 4 Drawing Sheets

(51) Int. Cl.
*B01D 39/20* (2006.01)
*C02F 1/461* (2006.01)
*C02F 101/16* (2006.01)
*C02F 103/20* (2006.01)

(52) U.S. Cl.
CPC .............. *C02F 1/46109* (2013.01); *C02F 2001/46133* (2013.01); *C02F 2101/163* (2013.01); *C02F 2101/166* (2013.01); *C02F 2103/20* (2013.01)

(58) Field of Classification Search
CPC .............. A01K 63/006; C02F 1/46109; C02F 2101/163; C02F 2101/166; C02F 2103/20; C02F 2001/46133; C02F 2101/30; C02F 1/4672; C02F 1/467; C02F 1/46176; C02F 2305/023; C02F 1/463; C02F 1/001; C02F 1/46; C02F 1/46114; C02F 1/46133; C02F 1/46142; C02F 1/68; C02F 1/70; C02F 1/705; C02F 1/72; C02F 1/722; C02F 1/725; C02F 2101/16; C02F 2101/38; C02F 2103/08; C02F 2305/02; C02F 2305/10; B01D 53/54; B01D 53/56; B01D 53/565; B01D 53/58; B01D 53/72; B01J 20/02; B01J 20/0203; B01J 20/0222; B01J 20/0225; B01J 20/0233; B01J 20/0237; B01J 20/024; B01J 20/0244; B01J 20/0248; B01J 20/0274; B01J 20/04; B01J 20/041; B01J 20/043; B01J 20/10; B01J 20/103; B01J 20/12; B01J 20/20; B01J 20/24; B01J 20/26; B01J 20/2803; B01J 21/00; B01J 21/02; B01J 21/06; B01J 21/16; B01J 23/00; B01J 23/02; B01J 23/32; B01J 23/34; B01J 23/38; B01J 23/40; B01J 23/42; B01J 23/48; B01J 23/52; B01J 23/54; B01J 23/70; B01J 23/07; B01J 23/74; B01J 23/745; B01J 39/08; B01J 39/09; B01J 39/10; B01J 41/08; B01J 41/10; B01J 41/12; B01J 43/00; B01J 2220/40; B01J 2220/42
USPC .... 210/167.21, 167.24, 167.25, 170.02, 243, 210/263, 500.1, 501, 502.1, 510.1, 749, 210/757, 758, 759, 763; 119/215, 226, 119/231, 245, 259, 261, 263, 268
See application file for complete search history.

(56) References Cited

U.S. PATENT DOCUMENTS

| | | | | |
|---|---|---|---|---|
| 2003/0102211 | A1* | 6/2003 | Nakamura | C02F 1/46109 204/276 |
| 2008/0073288 | A1* | 3/2008 | Fan | C02F 1/4691 204/554 |
| 2013/0168321 | A1* | 7/2013 | Cannon | B01J 20/3248 210/684 |
| 2013/0299400 | A1* | 11/2013 | Silver | C02F 3/005 210/150 |
| 2015/0353400 | A1* | 12/2015 | Dube | C02F 1/286 210/665 |

FOREIGN PATENT DOCUMENTS

| | | |
|---|---|---|
| CN | 103781730 | 5/2014 |
| CN | 104803487 | 7/2015 |

\* cited by examiner

FILTER MATERIAL FOR CULTURE SYSTEM, AND PREPARATION METHOD AND USE THEREOF

FIELD OF THE INVENTION

The present invention relates to the field of treatment of culture wastewater. In particular, the present invention relates to a filter material for a culture system, and a preparation method and use thereof.

BACKGROUND OF THE INVENTION

With social progress and economic development, aquaculture has entered more and more families and enterprises. Aquatic animals are generally cultured in closed aquariums. However, residual baits and animal excrements produce a large amount of pollutants such as ammonia nitrogen, nitrite, sulfide and the like, resulting in water pollution. In addition, turbid wastewater may affect the health of organisms and decrease ornamental value. Currently, this has become a common and important problem faced by aquaculture systems.

At present, purification treatment methods for the water body of aquaculture systems mainly use mechanical or biological filtration to maintain water quality, and to remove excessive baits, excrements, ammonia nitrogen, nitrite nitrogen, nitrate nitrogen and the like in the water body. The mechanical filtration involves the use of a gas or water pump to make water flow through filter material, and achieves the requirements for maintaining water quality by means of the adsorption of filter material or microbial action on the filter material. However, the filter material must be periodically changed to maintain efficacy. The biological filtration utilizes bacteria or microorganisms and the like, to perform a series of nitrogen fixation, dehydrogenation, carbon fixation, oxidation and the like, i.e., using the pollutant in the water body as a substrate, to reduce organic wastes and COD values in the water body. For example, CN104803487A discloses use of immobilized nitrifying bacteria for removing ammonia nitrogen from an aquarium. However, the biological filtration has a higher sensitivity to water parameters. If the water parameters are unsuitable for the survival of microorganisms or bacteria, the biological filtration would have unobvious effect or even be adverse. In addition, the prior art also discloses the combination of the mechanical filtration and biological filtration to achieve the purpose of water quality purification. For example, CN201286292Y discloses a reactor for physical interception in combined with biodegradation; and CN2564563Y discloses a device which produces biofilm effect and maintains ecological balance of water body by utilizing filtration, physical adsorption, chemical oxygenation and the like, but both have the above problems.

In order to solve the above problems present in the mechanical or biological filtration, an electrochemical method has been used as a new method for aquarium water purification, which uses an electro-Fenton reaction or three-dimensional electrode technology to treat organic wastes in water. That is, the electrochemical method uses hydroxyl radicals (.OH), which have extremely strong oxidability, an electrode potential of 2.8V and are catalytically generated in the system, to either oxidatively decompose macromolecular organics that are difficult to degrade in wastewater into micromolecular organics, or completely oxidize them into inorganics. For example, CN 103781730 B discloses a device comprising an electrochemical flocculation reactor and filter medium stored in an anaerobic medium cartridge, in which ammonia nitrogen wastes in an aquarium can be converted to nitrogen by using a carbon-based catalyst capable of generating hydroxyl groups. However, the disadvantage of this method is that the function of the anaerobic medium cartridge may be affected by dissolved oxygen in water, and only if electric current passes through it, reactions can be catalyzed to produce water purification effect.

For micro-electrolysis technology, a micro-electrolysis process currently uses iron and carbon as fillers in an acidic condition, in which iron acts as an anode and carbon acts as a cathode, to generate micro-current through numerous micro-current reactors formed between iron and carbon, so that organics can be oxidized and reduced under the action of micro-currents to realize the purification of wastewater. However, the micro-electrolysis technology is currently only used in industrial wastewater treatment. Since good treatment effect can be achieved only if the micro-electrolysis reaction is limited to pH below 4, it cannot be applied in aquaculture systems for which pH is required to be between 6 and 8. Further, hydroxyl radicals released during the treatment process will continuously increase pH of the water body. Once it exceeds tolerable pH value of organisms, it will lead to the death of organisms. In addition, the electrolytic reactor needs to be rinsed frequently and the micro-electrolytic material also needs to be changed frequently in practical applications. Further, currently used micro-electrolytic material is relatively simple and the treatment effect thereof is limited, which is prone to cause the death of organisms. At the same time, some problems such as hardening and blocking are extremely easy to occur when the micro-electrolytic material is immersed in wastewater for a long time, which will affect its service life.

Therefore, there is great market prospect to provide an efficient and durable filter material suitable for in-situ treatment of water body of aquaculture systems.

SUMMARY OF THE INVENTION

The present invention aims to provide a filter material for a culture system, as well as a preparation method and use thereof.

The technical solutions adopted by the present invention are as follows.

One object of the present invention is to provide a filter material for a culture system.

Said filter material may comprise following components: an anode material which is an active metal, and a cathode material which is an inactive metal or a conductive non-metal.

Preferably, the mass percentage of the anode material in the filter material may be 26-65%, and the mass percentage of the cathode material may be 15-50%.

Preferably, the mass percentage of the anode material may be 35-65%, and the mass percentage of the cathode material may be 20-50%.

More preferably, the mass percentage of the anode material may be 45-55%, and the mass percentage of the cathode material may be 30-45%.

Preferably, said filter material may further comprise at least one selected from a catalyst and an acidifying agent.

More preferably, said filter material may comprise a catalyst and an acidifying agent.

Wherein, said catalyst can be used to increase a reaction rate of the filter material or a production rate of hydroxyl radicals.

Preferably, in said filter material, a mass percentage of the catalyst may be 1-20%, and a mass percentage of the acidifying agent may be 0.05-20%.

Preferably, in said filter material, the mass percentage of the catalyst may be 3-10%, and the mass percentage of the acidifying agent may be 2-10%.

More preferably, the mass percentage of the catalyst may be 3-5%, and the mass percentage of the acidifying agent may be 5-10%.

Preferably, said filter material may further comprise a binder.

Preferably, in said filter material, a mass percentage of the binder may be 2-40%; preferably, the mass percentage of the binder may be 2-20%; more preferably, the mass percentage of the binder may be 5-10%.

Preferably, when said filter material comprises an acidifying agent, the filter material may further comprise silicon dioxide and a sustained-release material.

Preferably, the mass ratio of the acidifying agent:silicon dioxide:the sustained-release material may be 1:(0.1-0.5):(0.3-1).

More preferably, the mass ratio of the acidifying agent:silicon dioxide:the sustained-release material may be 1:(0.3-0.5):(0.6-0.8).

Wherein, said sustained-release material may be a macromolecular compound.

Since the water of the culture system is used to maintain the survival of organism and the pH value of the water body is required to be hold in a range between 6 and 8, it is necessary to select anode and cathode materials on which the electrolytic reaction can perform within such pH range.

Preferably, said anode material may be at least one selected from iron, aluminum, zinc, copper, platinum and gold.

More preferably, said anode material may be at least one selected from iron, aluminum, zinc and copper.

Preferably, in one preferred embodiment, the anode material may be a mixture of iron and aluminum; preferably, the mass ratio of iron:aluminum may be 1:(0.1-1); more preferably, the mass ratio of iron:aluminum may be 1:(0.5-1).

Preferably, in another preferred embodiment, the anode material may be a mixture of iron and zinc; preferably, the mass ratio of iron:zinc may be 1:(0.1-0.8); more preferably, the mass ratio of iron:zinc may be 1:(0.1-0.5).

Preferably, in one still preferred embodiment, the anode material may be a mixture of iron, aluminum and zinc; preferably, the mass ratio of iron:aluminum:zinc may be 1:(0.2-0.6):(0.05-0.4); more preferably, the mass ratio of iron:aluminum:zinc may be 1:(0.3-0.5):(0.1-0.3).

Preferably, in one still preferred embodiment, the anode material may be a mixture of iron, aluminum, zinc and copper; preferably, the mass ratio of iron:aluminum:zinc:copper may be 1:(0.2-0.6):(0.05-0.4):(0.01-0.08); more preferably, the mass ratio of iron:aluminum:zinc:copper may be 1:(0.3-0.5):(0.1-0.3):(0.03-0.06).

Note that said anode material is not limited to the ratios or combinations of the above preferred embodiments. For example, the anode material may also be a mixture of iron, zinc and copper; preferably, the mass ratio of iron:zinc:copper may be 1:(0.1-0.8):(0.01-0.12); more preferably, the mass ratio of iron:zinc:copper may be 1:(0.1-0.5):(0.05-0.1), and the like.

Preferably, said cathode material may be at least one selected from carbon and manganese.

If the cathode material is a mixture of carbon and manganese, the mass ratio of carbon:manganese may be 1:(0.05-0.5); more preferably, the mass ratio of carbon:manganese may be 1:(0.1-0.4).

Preferably, said binder may be at least one selected from clay, sodium silicate, polyvinyl alcohol, sodium carboxymethylcellulose and bentonite.

Preferably, in one preferred embodiment, the binder may be a mixture of clay and sodium silicate; preferably, the mass ratio of clay:sodium silicate may be (1-2):(1-2).

Preferably, in another preferred embodiment, the binder may be a mixture of polyvinyl alcohol and sodium carboxymethylcellulose; preferably, the mass ratio of polyvinyl alcohol:sodium carboxymethylcellulose may be (1-2):(1-2).

Preferably, in one still preferred embodiment, the binder may be a mixture of clay, sodium carboxymethylcellulose and polyvinyl alcohol; preferably, the mass ratio of clay:sodium carboxymethylcellulose:polyvinyl alcohol may be (1-2):(1-2):(1-2).

Note that said binder is not limited to the ratios or combinations of the above preferred embodiments.

Preferably, said catalyst may be at least one selected from calcium peroxide, calcium oxide, calcium carbonate, calcium hydroxide and silicon dioxide.

Preferably, in one preferred embodiment, the catalyst may be a mixture of calcium peroxide and calcium carbonate; preferably, the mass ratio of calcium peroxide:calcium carbonate may be 1:(0.1-1); more preferably, the mass ratio of calcium peroxide:calcium carbonate may be 1:(0.3-0.6).

Preferably, in another preferred embodiment, the catalyst may be a mixture of calcium oxide and silicon dioxide; more preferably, the mass ratio of calcium oxide:silicon dioxide may be 1:(0.1-1); more preferably, the mass ratio of calcium oxide:silicon dioxide may be 1:(0.3-0.6).

Note that said catalyst is not limited to the combinations or ratios of the above preferred embodiments. For example, the catalyst may further be a mixture of calcium peroxide, calcium carbonate and calcium hydroxide, and the mass ratio of calcium peroxide:calcium carbonate:calcium hydroxide may be 1:(0.1-1):(0.1-1), and the like.

Preferably, said acidifying agent may be at least one selected from phosphoric acid, malic acid, citric acid, fumaric acid, lactic acid, formic acid, acetic acid, propionic acid, butyric acid and sorbic acid.

Preferably, in one preferred embodiment, the acidifying agent may be a mixture of phosphoric acid, lactic acid and formic acid; preferably, the mass ratio of phosphoric acid:lactic acid:formic acid may be 1:(0.1-1):(0.1-1); more preferably, the mass ratio of phosphoric acid:lactic acid:formic acid may be 1:(0.3-0.6):(0.3-0.6).

Preferably, in another preferred embodiment, the acidifying agent may be a mixture of phosphoric acid, citric acid and fumaric acid; preferably, the mass ratio of phosphoric acid:citric acid:fumaric acid may be 1:(0.5-2):(0.5-2); more preferably, the mass ratio of phosphoric acid:citric acid:fumaric acid may be 1:(0.8-1):(0.8-1).

Note that said acidifying agent is not limited to the combinations or ratios of the above preferred embodiments. For example, the acidifying agent may further be a mixture of phosphoric acid, malic acid and citric acid, and the mass ratio of phosphoric acid:malic acid:citric acid may be 1:(0.1-0.8):(0.1-0.8), and the like.

Preferably, said sustained-release material may be at least one selected from ethyl cellulose, hydroxypropyl methyl cellulose, acrylic resin, shellac, sodium alginate, maltodextrin, modified starch, stearic acid, magnesium stearate, sodium carboxymethylcellulose and xanthan gum.

Preferably, in one preferred embodiment, the sustained-release material may be a mixture of stearic acid and magnesium stearate; preferably, the mass ratio of stearic acid:magnesium stearate may be (1-3):(1-3).

Preferably, in another preferred embodiment, the sustained-release material may be a mixture of shellac and sodium carboxymethylcellulose; preferably, the mass ratio of shellac:sodium carboxymethylcellulose may be (1-3):(1-3).

Note that said sustained-release material is not limited to the combinations or ratios of the above preferred embodiments. For example, the sustained-release material may further be a mixture of shellac, magnesium stearate and sodium carboxymethylcellulose, and the mass ratio of shellac:magnesium stearate:sodium carboxymethylcellulose may be 1:(0.8-1.2):(0.8-1.2), and the like.

Preferably, said filter material may be of a granular structure, preferably has a particle size of 0.1-20 mm.

More preferably, the filter material may have a particle size of 0.1-5 mm.

Said culture system may be a livestock breeding system or an aquaculture system. If said filter material is applied to an aquaculture system, the filter material could facilitate solving the disadvantages of aquaculture systems which are treated with microelectrolysis and may cause organisms death, of the prior art.

Another object of the present invention is to provide a method for preparing said filter material, which may include the following steps:

1) mixing the components of the filter material well, adding water and aging to stabilize, to give a mixture;

2) subjecting the mixture to extrusion molding and drying, to give the filter material.

Preferably, the time for the aging to stabilize in step 1) may be 30-60 min.

Preferably, before mixing the components of the filter material, the method may further comprise a step of calcining the anode and cathode materials of the filter material with isolating oxygen.

Preferably, the calcination temperature may be 800-1000° C. and the calcination time may be 1.5-3 h.

The present invention further provides an in-situ water body treatment method of a culture system.

Sadi method performs an in-situ treatment by using the filter material as described above, without applying additional voltage or current to the filter material.

The beneficial effects of the present invention are as follows.

1. In the present invention, the specific surface area inside the filter material is increased by controlling the particle sizes of the filter material to achieve a suitable reaction area, without using a porous carrier or acid etching. This approach is beneficial to reduce the retention time of the wastewater in pores and reduce the consumption of hydroxyl radicals in a water body which is polluted at a low degree. In addition, as the peeling and renewal of the surface of the filter material, the corrosion rate of the filter material can be reduced, which is favorable for maintaining the water purification effect of the filter material for a long time.

2. The filter material of the present invention preferably comprises iron, aluminum and zinc, which produce iron, aluminum and zinc ions through electrolysis. Then, the iron, aluminum and zinc ions are combined with hydroxyl radicals to produce iron hydroxide, aluminum hydroxide and zinc hydroxide which act as continuously released flocculants to deposit organics and impurities in the water, thereby achieving the effect of water clarification.

3. According to the present invention, different catalysts can be selected based on different culture conditions and water quality conditions, to improve the reaction rate of the micro-electrolysis and the production rate of the hydroxyl radical, and to increase the dissolved oxygen content in the water and the oxidation reaction of the organic wastes.

4. An acidifying agent is preferably added in the filter material of the present invention. The acidifying agent of the present invention may be an intermediate acid produced during physiological reactions, which is harmless to organisms but can achieve antibacterial effect. Meanwhile, the addition of the acidifying agent can maintain the acidity of the microenvironment of the electrolytic reaction, which is beneficial to reduce agglomeration, short-flow, channel flow and the like, increase the reaction rate of electrolysis and prolong the service life. Further, the addition of the acidifying agent has no influence on the pH value beyond the microenvironment of the electrolysis reaction, and solves the problem of gradual alkalization of the electrolyzed water which is adverse to the survival of organisms. With the action of the acidifying agent, the water treated with the filter material can be maintained at a pH value around neutrality, and can be directly recycled in the aquaculture system.

5. The acidifying agent used by the present invention is preferably an acidifying agent embedded in a sustained-release material. The acidifying agent can adjust the releasing rate of acid by adjusting the addition amount of the sustained-release material, so as to maintain the acidity of the microenvironment of the micro-electrolysis reaction. Meanwhile, organic wastes can be adsorbed onto the filter material by means of the adsorption function of the sustained-release layer material, to accelerate its oxidizing reaction.

DETAILED DESCRIPTION OF THE EMBODIMENTS

Figure 1:
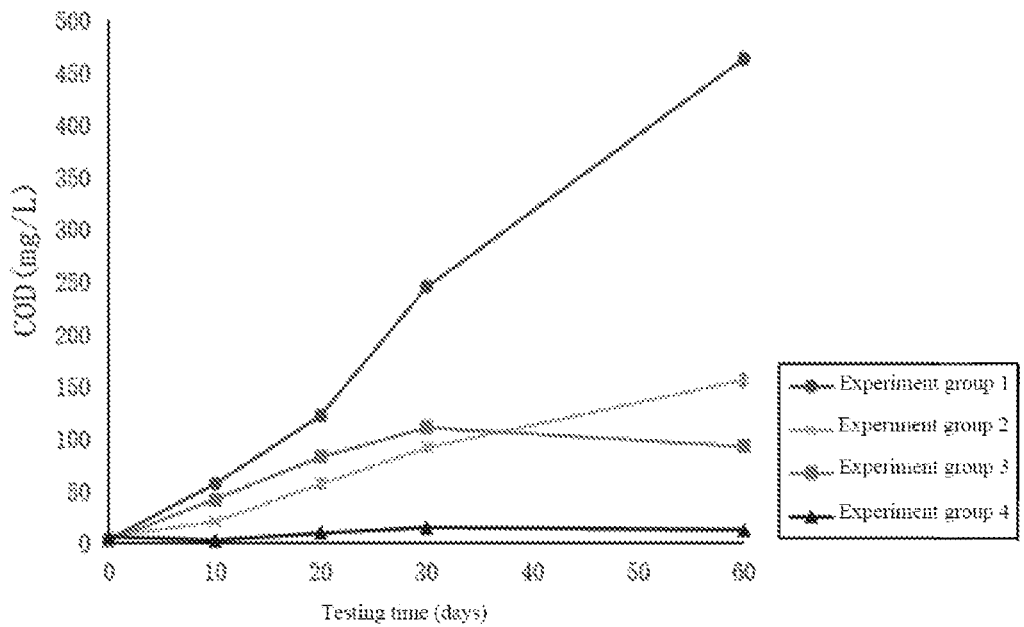
FIG. 1 is a graph showing changes in COD concentration of water body over time in a process of treating an aquarium with different filter materials.

The present invention will be further illustrated by the examples listed below. It should be understood that the following examples are only intended to further illustrate the present invention and not to be construed as limiting the protection scope of the present invention. Some improvements and modifications can be made by those skilled in the art in accordance with the principles set forth herein, and all belong to the protection scope of the present invention. The following specific process parameters and the like are only exemplary within a suitable range. That is, those skilled in the art can make selections within a suitable range in accordance with the description herein, and are not limited to the specific data exemplified below.

Example 1

A filter material for a culture system consisted of the following components (% by mass):
50% of an anode material, 30% of a cathode material, 8% of a binder, 5% of a catalyst, and 7% of an acidifying agent, wherein
the anode material: a mixture of iron and aluminum in a mass ratio of 1:0.8;
the cathode material: carbon;
the binder: a mixture of clay and sodium silicate in a mass ratio of 1:1;
the catalyst: a mixture of calcium peroxide and calcium carbonate in a mass ratio of 1:0.5;
the acidifying agent: a mixture of phosphoric acid, lactic acid and formic acid in a mass ratio of 1:0.5:0.5, this mixture was then mixed well with silicon dioxide and embedded with a sustained-release material to give a mixture, wherein the mass ratio of the acidifying agent, silicon dioxide and the sustained-release material was 1:0.5:0.8, and the sustained-release material was a mixture of stearic acid and magnesium stearate in a mass ratio of 1:1.

This filter material was applied to a closed freshwater aquarium system with serious pollution and high aquaculture density. Before the application of this filter material, the water quality was: COD=412.8 mg/L, ammonia nitrogen=11.3 mg/L, nitrate=63.5 mg/L, nitrite=0.73 mg/L, dissolved oxygen=3.2 mg/L, bacteria content=$8\times10^6$/mL, pH=6.1.

This filter material was directly placed in the water body of the aquarium (the mass of this filter material:the volume of the water body=1:20 g/mL). After treating with this filter material for 24 h, the water quality was: COD=61.7 mg/L, ammonia nitrogen=2.8 mg/L, nitrate=32.3 mg/L, nitrite=0.04 mg/L, dissolved oxygen=5.8 mg/L, bacteria content=$2\times10^2$/mL, pH=7.3. After treating for 48 h, the water quality was: COD=15.5 mg/L, ammonia nitrogen=0.6 mg/L, nitrate=12.2 mg/L, nitrite=0.003 mg/L, dissolved oxygen=6.9 mg/L, no detectable bacterial content, pH=7.2.

Example 2

A filter material for a culture system consisted of the following components (% by mass):
45% of an anode material, 35% of a cathode material, 5% of a binder, 10% of a catalyst, and 5% of an acidifying agent, wherein
the anode material: a mixture of iron, zinc and copper in a mass ratio of 1:0.3:0.15;
the cathode material: a mixture of carbon and manganese in a mass ratio of 1:0.3;
the binder: a mixture of clay, sodium silicate and polyvinyl alcohol in a mass ratio of 1:1:1;
the catalyst: calcium oxide,
the acidifying agent: a mixture of phosphoric acid and malic acid in a mass ratio of 1:1, this mixture was then mixed well with silicon dioxide and embedded with a sustained-release material to give a mixture, wherein the mass ratio of the acidifying agent, silicon dioxide and the sustained-release material was 1:0.3:0.6, and the sustained-release material was a mixture of maltodextrin and modified starch in a mass ratio of 1:1.

This filter material was applied to a closed freshwater aquarium system with moderate pollution and general aquaculture density. Before the application of this filter material, the water quality was: COD=252.4 mg/L, ammonia nitrogen=8.6 mg/L, nitrate=57.7 mg/L, nitrite=0.06 mg/L, dissolved oxygen=4.3 mg/L, bacteria content=$6\times10^4$/mL, pH=6.8.

This filter material was directly placed in the water body of the aquarium (the mass of this filter material:the volume of the water body=1:20 g/mL). After treating with this filter material for 24 h, the water quality was: COD=32.7 mg/L, ammonia nitrogen=1.6 mg/L, nitrate=25.1 mg/L, nitrite=0.002 mg/L, dissolved oxygen=6.5 mg/L, no detectable bacterial content, pH=7.5. After treating for 48 h, the water quality was: COD=11.5 mg/L, ammonia nitrogen=0.4 mg/L, nitrate=3.5 mg/L, nitrite=0 mg/L, dissolved oxygen=7.8 mg/L, no detectable bacterial content, pH=7.2.

Example 3

A filter material for a culture system consisted of the following components (% by mass):
45% of an anode material, 35% of a cathode material, 5% of a binder, 10% of a catalyst, and 5% of an acidifying agent, wherein
the anode material: a mixture of iron, aluminum and zinc in a mass ratio of 1:0.4:0.2;
the cathode material: a mixture of carbon and manganese in a mass ratio of 1:0.2;
the binder: a mixture of clay and sodium carboxymethylcellulose in a mass ratio of 1:1;
the catalyst: a mixture of calcium peroxide and calcium carbonate in a mass ratio of 1:1;
the acidifying agent: phosphoric acid, it was then mixed well with silicon dioxide and embedded with a sustained-release material, wherein the mass ratio of the acidifying agent, silicon dioxide and the sustained-release material was 1:0.4:0.6, and the sustained-release material was a mixture of shellac, magnesium stearate and sodium carboxymethylcellulose in a mass ratio of 1:1:1.

This filter material was applied to a closed seawater aquarium system with serious pollution and high aquaculture density. Before the application of this filter material, the water quality was: COD=533.4 mg/L, ammonia nitrogen=13.3 mg/L, nitrate=73.1 mg/L, nitrite=0.58 mg/L, dissolved oxygen=3.8 mg/L, bacteria content=$7\times10^7$/mL, pH=6.3.

This filter material was directly placed in the water body of the aquarium (the mass of this filter material:the volume of the water body=1:20 g/mL). After treating with this filter material for 24 h, the water quality was: COD=33.3 mg/L, ammonia nitrogen=1.9 mg/L, nitrate=35.1 mg/L, nitrite=0.02 mg/L, dissolved oxygen=5.9 mg/L, bacteria content=$4\times10^2$/mL, pH=7.2. After treating for 48 h, the water quality was: COD=11.3 mg/L, ammonia nitrogen=0.2 mg/L, nitrate=9.7 mg/L, nitrite=0 mg/L, dissolved oxygen=6.8 mg/L, no detectable bacterial content, pH=7.4.

Example 4

A filter material for a culture system consisted of the following components (% by mass):

55% of an anode material, 30% of a cathode material, 5% of a binder, 5% of a catalyst, and 5% of an acidifying agent, wherein the anode material: a mixture of iron and aluminum in a mass ratio of 1:0.8;

the cathode material: carbon;

the binder: a mixture of polyvinyl alcohol and sodium carboxymethylcellulose in a mass ratio of 1:1;

the catalyst: a mixture of calcium peroxide, calcium carbonate and calcium hydroxide in a mass ratio of 0.5:0.5:1;

the acidifying agent: a mixture of phosphoric acid and malic acid in a mass ratio of 1:1, this mixture was then mixed well with silicon dioxide and embedded with a sustained-release material to give a mixture, wherein the mass ratio of the acidifying agent, silicon dioxide and the sustained-release material was 1:0.4:0.8, and the sustained-release material was a mixture of stearic acid and sodium carboxymethylcellulose in a mass ratio of 1:1.

This filter material was applied to a closed seawater aquarium system with moderate pollution and general aquaculture density. Before the application of this filter material, the water quality was: COD=275.6 mg/L, ammonia nitrogen=8.9 mg/L, nitrate=36.8 mg/L, nitrite=0.09 mg/L, dissolved oxygen=5.2 mg/L, bacteria content=$3 \times 10^3$/mL, pH=7.1.

This filter material was directly placed in the water body of the aquarium (the mass of the filter material:the volume of the water body=1:20 g/mL). After treating with this filter material for 24 h, the water quality was: COD=15.1 mg/L, ammonia nitrogen=0.9 mg/L, nitrate=13.4 mg/L, nitrite=0.004 mg/L, dissolved oxygen=6.8 mg/L, no detectable bacterial content, pH=7. After treating for 48 h, this water quality was: COD=3.4 mg/L, ammonia nitrogen=0.4 mg/L, nitrate=7.3 mg/L, nitrite=0 mg/L, dissolved oxygen=7.5 mg/L, no detectable bacterial content, pH=7.1.

Example 5

A filter material for a culture system consisted of the following components (% by mass):

45% of an anode material, 35% of a cathode material, 10% of a binder, and 10% of an acidifying agent, wherein the anode material: a mixture of iron and zinc in a mass ratio of 1:0.3;

the cathode material: a mixture of carbon and manganese in a mass ratio of 1:0.3;

the binder: a mixture of polyvinyl alcohol and sodium carboxymethylcellulose in a mass ratio of 1:1;

the acidifying agent: a mixture of phosphoric acid, citric acid and fumaric acid in a mass ratio of 1:1:1, this mixture was then mixed well with silicon dioxide and embedded with a sustained-release material to give a mixture, wherein the mass ratio of the acidifying agent, silicon dioxide and the sustained-release material was 1:0.3:0.6, and the sustained-release material was a mixture of shellac and sodium carboxymethylcellulose in a mass ratio of 1:1.

This filter material was applied to a closed freshwater aquarium system with moderate pollution and general aquaculture density. Before the application of this filter material, the water quality was: COD=252.4 mg/L, ammonia nitrogen=8.6 mg/L, nitrate=57.7 mg/L, nitrite=0.06 mg/L, dissolved oxygen=4.3 mg/L, bacteria content=$6 \times 10^4$/mL, pH=6.8.

This filter material was directly placed in the water body of the aquarium (the mass of this filter material:the volume of the water body=1:20 g/mL). After treating with this filter material for 24 h, the water quality was: COD=33.5 mg/L, ammonia nitrogen=1.3 mg/L, nitrate=27.3 mg/L, nitrite=0.006 mg/L, dissolved oxygen=6.7 mg/L, no detectable bacterial content, pH=7.3. After treating for 48 h, the water quality was: COD=14.2 mg/L, ammonia nitrogen=0.3 mg/L, nitrate=7.8 mg/L, nitrite=0 mg/L, dissolved oxygen=7.8 mg/L, no detectable bacterial content, pH=7.1.

Example 6

A filter material for a culture system consisted of the following components (% by mass):

45% of an anode material, 40% of a cathode material, 5% of a binder, and 10% of an acidifying agent, wherein the anode material: a mixture of iron and aluminum in a mass ratio of 1:0.8;

the cathode material: carbon;

the binder: a mixture of sodium silicate and polyvinyl alcohol in a mass ratio of 1:1;

the acidifying agent: a mixture of phosphoric acid, malic acid and citric acid in a mass ratio of 1:0.5:0.5, this mixture was then mixed well with silicon dioxide and embedded with a sustained-release material to give a mixture, wherein the mass ratio of the acidifying agent, silicon dioxide and the sustained-release material was 1:0.5:0.8, and the sustained-release material was a mixture of magnesium stearate and sodium carboxymethylcellulose in a mass ratio of 1:1.

This filter material was applied to a closed freshwater aquarium system with serious pollution and high aquaculture density. Before the application of this filter material, the water quality was: COD=412.8 mg/L, ammonia nitrogen=11.3 mg/L, nitrate=63.5 mg/L, nitrite=0.73 mg/L, dissolved oxygen=3.2 mg/L, bacteria content=$8 \times 10^6$/mL, pH=6.1.

This filter material was directly placed in the water body of the aquarium (the mass of this filter material:the volume of the water body=1:20 g/mL). After treating with this filter material for 24 h, the water quality was: COD=128.9 mg/L, ammonia nitrogen=6.7 mg/L, nitrate=45.4 mg/L, nitrite=0.56 mg/L, dissolved oxygen=4.9 mg/L, bacteria content=$3 \times 10^3$/mL, pH=6.8. After treating for 48 h, the water quality was: COD=54.3 mg/L, ammonia nitrogen=3.2 mg/L, nitrate=27.1 mg/L, nitrite=0.21 mg/L, dissolved oxygen=5.5 mg/L, bacteria content=$4 \times 10^2$/mL, pH=7.2.

Example 7

A filter material for a culture system consisted of the following components (% by mass):

45% of an anode material, 45% of a cathode material, 5% of a binder, and 5% of an acidifying agent, wherein the anode material: a mixture of iron, aluminum and zinc in a mass ratio of 1:0.4:0.2;

the cathode material: a mixture of carbon and manganese in a mass ratio of 1:0.2;

the binder: sodium silicate;

the acidifying agent: fumaric acid, it was then mixed well with silicon dioxide and embedded with a sustained-release material to give a mixture, wherein the mass ratio of the acidifying agent, silicon dioxide and the sustained-release material was 1:0.4:0.6, and the sustained-release material was a mixture of maltodextrin and stearic acid in a mass ratio of 1:1.

This filter material was applied to a closed seawater aquarium system with serious pollution and high aquaculture density. Before treating with this filter material, the water quality was: COD=533.4 mg/L, ammonia nitrogen=13.3 mg/L, nitrate=73.1 mg/L, nitrite=0.58 mg/L, dissolved oxygen=3.8 mg/L, bacteria content=$7\times10^7$/mL, pH=6.3.

This filter material was directly placed in the water body of the aquarium (the mass of this filter material:the volume of the water body=1:20 g/mL). After treating with this filter material for 24 h, the water quality was: COD=50.7 mg/L, ammonia nitrogen=3.3 mg/L, nitrate=52.1 mg/L, nitrite=0.14 mg/L, dissolved oxygen=4.7 mg/L, bacteria content=$2\times10^3$/mL, pH=6.8. After treating for 48 h, the water quality was: COD=21.7 mg/L, ammonia nitrogen=1.1 mg/L, nitrate=22.2 mg/L, nitrite=0.004 mg/L, dissolved oxygen=5.7 mg/L, bacteria content=$1\times10^2$/mL, pH=7.

Example 8

A filter material for a culture system consisted of the following components (% by mass):

55% of an anode material, 35% of a cathode material, 5% of a binder, and 5% of an acidifying agent, wherein the anode material: a mixture of iron and aluminum in a mass ratio of 1:0.8;

the cathode material: carbon;

the binder: a mixture of sodium silicate and sodium carboxymethylcellulose in a mass ratio of 1:1;

the acidifying agent: a mixture of lactic acid and formic acid in a mass ratio of 1:1, this mixture was then mixed well with silicon dioxide and embedded with a sustained-release material to give a mixture, wherein the mass ratio of the acidifying agent, silicon dioxide and the sustained-release material was 1:0.4:0.8, and the sustained-release material was a mixture of shellac, maltodextrin and magnesium stearate in a mass ratio of 1:1:1.

This filter material was applied to a closed seawater aquarium system with moderate pollution and general aquaculture density. Before the application of this filter material, the water quality was: COD=275.6 mg/L, ammonia nitrogen=8.9 mg/L, nitrate=36.8 mg/L, nitrite=0.09 mg/L, dissolved oxygen=5.2 mg/L, bacteria content=$3\times10^3$/mL, pH=7.1.

This filter material was directly placed in the water body of the aquarium (the mass of this filter material:the volume of the water body=1:20 g/mL). After treating with this filter material for 24 h, the water quality was: COD=20.3 mg/L, ammonia nitrogen=1 mg/L, nitrate=11.2 mg/L, nitrite=0.005 mg/L, dissolved oxygen=6.3 mg/L, no detectable bacterial content, pH=6.9. After treating for 48 h, the water quality was: COD=4.5 mg/L, ammonia nitrogen=0.5 mg/L, nitrate=6.5 mg/L, nitrite=0.001 mg/L, dissolved oxygen=7 mg/L, no detectable bacterial content, pH=7.

Example 9

A filter material for a culture system consisted of the following components (% by mass):

45% of an anode material, 45% of a cathode material, 5% of a binder, and 5% of a catalyst, wherein the anode material: a mixture of iron, aluminum, zinc and copper in a mass ratio of 1:0.4:0.2:0.05;

the cathode material: a mixture of carbon and manganese in a mass ratio of 1:0.2;

the binder: a mixture of clay, sodium carboxymethylcellulose and polyvinyl alcohol in a mass ratio of 1:1:1;

the catalyst: a mixture of calcium oxide and silicon dioxide in a mass ratio of 1:0.5.

This filter material was applied to a closed seawater aquarium system with serious pollution and high aquaculture density. Before the application of this filter material, the water quality was: COD=533.4 mg/L, ammonia nitrogen=13.3 mg/L, nitrate=73.1 mg/L, nitrite=0.58 mg/L, dissolved oxygen=3.8 mg/L, bacteria content=$7\times10^7$/mL, pH=6.3.

This filter material was directly placed in the water body of the aquarium (the mass of this filter material:the volume of the water body=1:20 g/mL). After treating with this filter material for 24 h, the water quality was: COD=43.2 mg/L, ammonia nitrogen=1.7 mg/L, nitrate=44.5 mg/L, nitrite=0.01 mg/L, dissolved oxygen=5.6 mg/L, bacteria content=300/mL, pH=7.5. After treating for 48 h, the water quality was: COD=16.5 mg/L, ammonia nitrogen=0.3 mg/L, nitrate=14.2 mg/L, nitrite=0 mg/L, dissolved oxygen=6.9 mg/L, no detectable bacterial content, pH=7.3.

Example 10

A filter material for a culture system consisted of the following components (% by mass):

45% of an anode material, 40% of a cathode material, 5% of a binder, and 10% of a catalyst, wherein the anode material: a mixture of iron and aluminum in a mass ratio of 1:0.8;

the cathode material: carbon;

the binder: a mixture of sodium silicate and sodium carboxymethylcellulose in a mass ratio of 1:1;

the catalyst: a mixture of calcium peroxide, calcium carbonate and calcium hydroxide in a mass ratio of 1:0.5:0.5.

This filter material was applied to a closed freshwater aquarium system with serious pollution and high aquaculture density. Before the application of this filter material, the water quality was: COD=412.8 mg/L, ammonia nitrogen=11.3 mg/L, nitrate=63.5 mg/L, nitrite=0.73 mg/L, dissolved oxygen=3.2 mg/L, bacteria content=$8\times10^6$/mL, pH=6.1.

This filter material was directly placed in the water body of the aquarium (the mass of this filter material:the volume of the water body=1:20 g/mL). After treating with this filter material for 24 h, the water quality was: COD=131.2 mg/L, ammonia nitrogen=5.3 mg/L, nitrate=52.8 mg/L, nitrite=0.37 mg/L, dissolved oxygen=5.2 mg/L, bacteria content=$1\times10^3$/mL, pH=7.5. After treating for 48 h, the water quality was: COD=48.1 mg/L, ammonia nitrogen=2.1 mg/L, nitrate=21.2 mg/L, nitrite=0.11 mg/L, dissolved oxygen=6 mg/L, no detectable bacterial content, pH=7.8.

Example 11

A filter material for a culture system consisted of the following components (% by mass):

45% of an anode material, 35% of a cathode material, 10% of a binder, and 10% of a catalyst, wherein the anode material: a mixture of iron, zinc and copper in a mass ratio of 1:0.3:0.08;

the cathode material: a mixture of carbon and manganese in a mass ratio of 1:0.3;

the binder: sodium carboxymethylcellulose;

the catalyst: a mixture of calcium peroxide, and calcium hydroxide in a mass ratio of 0.5:1.

This filter material was applied to a closed freshwater aquarium system with moderate pollution and general aquaculture density. Before the application of this filter material, the water quality was: COD=252.4 mg/L, ammonia nitrogen=8.6 mg/L, nitrate=57.7 mg/L, nitrite=0.06 mg/L, dissolved oxygen=4.3 mg/L, bacteria content=6×10$^4$/mL, pH=6.8.

This filter material was directly placed in the water body of the aquarium (the mass of this filter material:the volume of the water body=1:20 g/mL). After treating with this filter material for 24 h, the water quality was: COD=67.2 mg/L, ammonia nitrogen=4.3 mg/L, nitrate=39.5 mg/L, nitrite=0.03 mg/L, dissolved oxygen=5.5 mg/L, bacteria content=7×10$^2$/mL, pH=7.6. After treating for 48 h, the water quality was: COD=27.6 mg/L, ammonia nitrogen=1.9 mg/L, nitrate=16.3 mg/L, nitrite=0.008 mg/L, dissolved oxygen=6.5 mg/L, no detectable bacterial content, pH=8.1.

Example 12

A filter material for a culture system consisted of the following components (% by mass):
55% of an anode material, 35% of a cathode material, 5% of a binder, and 5% of a catalyst, wherein
the anode material: a mixture of iron and aluminum in a mass ratio of 1:0.8;
the cathode material: carbon;
the binder: sodium silicate;
the catalyst: calcium peroxide.

This filter material was applied to a closed seawater aquarium system with moderate pollution and general aquaculture density. Before the application of this filter material, the water quality was: COD=275.6 mg/L, ammonia nitrogen=8.9 mg/L, nitrate=36.8 mg/L, nitrite=0.09 mg/L, dissolved oxygen=5.2 mg/L, bacteria content=3×10$^3$/mL, pH=7.1.

This filter material was directly placed in the water body of the aquarium (the mass of this filter material:the volume of the water body=1:20 g/mL). After treating with this filter material for 24 h, the water quality was: COD=18.2 mg/L, ammonia nitrogen=2.1 mg/L, nitrate=14.4 mg/L, nitrite=0.006 mg/L, dissolved oxygen=6.1 mg/L, no detectable bacterial content, pH=7.6. After treating for 48 h, the water quality was: COD=6.3 mg/L, ammonia nitrogen=0.7 mg/L, nitrate=6.4 mg/L, nitrite=0.002 mg/L, dissolved oxygen=6.8 mg/L, no detectable bacterial content, pH=8.1.

Example 13

A filter material for a culture system consisted of the following components (% by mass):
60% of an anode material, 30% of a cathode material, and 10% of a binder, wherein
the anode material: a mixture of iron and aluminum in a mass ratio of 1:0.8;
the cathode material: carbon;
the binder: clay.

This filter material was applied to a closed seawater aquarium system with moderate pollution and general aquaculture density. Before the application of this filter material, the water quality was: COD=275.6 mg/L, ammonia nitrogen=8.9 mg/L, nitrate=36.8 mg/L, nitrite=0.09 mg/L, dissolved oxygen=5.2 mg/L, bacteria content=3×10$^3$/mL, pH=7.1.

This filter material was directly placed in the water body of the aquarium (the mass of this filter material:the volume of the water body=1:20 g/mL). After treating with this filter material for 24 h, the water quality was: COD=22.1 mg/L, ammonia nitrogen=1.2 mg/L, nitrate=12.7 mg/L, nitrite=0.004 mg/L, dissolved oxygen=6.9 mg/L, bacteria content=2×10$^2$/mL, pH=7.5. After treating for 48 h, the water quality was: COD=9.1 mg/L, ammonia nitrogen=0.5 mg/L, nitrate=7.6 mg/L, nitrite=0.001 mg/L, dissolved oxygen=7.2 mg/L, no detectable bacterial content, pH=7.8.

Example 14

A filter material for a culture system consisted of the following components (% by mass):
50% of an anode material, 40% of a cathode material, and 10% of a binder, wherein
the anode material: a mixture of iron and aluminum in a mass ratio of 1:0.8;
the cathode material: carbon;
the binder: a mixture of clay and sodium silicate in a mass ratio of 1:1.

This filter material was applied to a closed freshwater aquarium system with serious pollution and high aquaculture density. Before the application of this filter material, the water quality was: COD=412.8 mg/L, ammonia nitrogen=11.3 mg/L, nitrate=63.5 mg/L, nitrite=0.73 mg/L, dissolved oxygen=3.2 mg/L, bacteria content=8×10$^6$/mL, pH=6.1.

This filter material was directly placed in the water body of the aquarium (the mass of this filter material:the volume of the water body=1:20 g/mL). After treating with this filter material for 24 h, the water quality was: COD=180.3 mg/L, ammonia nitrogen=8.4 mg/L, nitrate=51.1 mg/L, nitrite=0.61 mg/L, dissolved oxygen=3.9 mg/L, bacteria content=1.5×10$^3$/mL, pH=7.6. After treating for 48 h, the water quality was: COD=74.5 mg/L, ammonia nitrogen=5.2 mg/L, nitrate=35.7 mg/L, nitrite=0.42 mg/L, dissolved oxygen=4.3 mg/L, and bacteria content=5×10$^2$/mL, pH=7.9.

Example 15

A filter material for a culture system consisted of the following components (% by mass):
50% of an anode material, 40% of a cathode material, and 10% of a binder, wherein
the anode material: a mixture of iron and zinc in a mass ratio of 1:0.3;
the cathode material: a mixture of carbon and manganese in a mass ratio of 1:0.3;
the binder: polyvinyl alcohol.

This filter material was applied to a closed freshwater aquarium system with moderate pollution and general aquaculture density. Before the application of this filter material, the water quality was: COD=252.4 mg/L, ammonia nitrogen=8.6 mg/L, nitrate=57.7 mg/L, nitrite=0.06 mg/L, dissolved oxygen=4.3 mg/L, bacteria content=6×10$^4$/mL, pH=6.8.

This filter material was directly placed in the water body of the aquarium (the mass of this filter material:the volume of the water body=1:20 g/mL). After treating with this filter material for 24 h, the water quality was: COD=89.3 mg/L, ammonia nitrogen=5.6 mg/L, nitrate=35.1 mg/L, nitrite=0.05 mg/L, dissolved oxygen=5 mg/L, bacteria content=1×10$^3$/mL, pH=7.5. After treating for 48 h, the water quality was: COD=39.9 mg/L, ammonia nitrogen=3.7 mg/L, nitrate=22.2 mg/L, nitrite=0.01 mg/L, dissolved oxygen=5.7 mg/L, bacteria content=2×10$^2$/mL, pH=7.9.

Example 16

A filter material for a culture system consisted of the following components (% by mass):

50% of an anode material, 40% of a cathode material, and 10% of a binder, wherein the anode material: a mixture of iron, aluminum and zinc in a mass ratio of 1:0.4:0.2;

the cathode material: a mixture of carbon and manganese in a mass ratio of 1:0.2;

the binder: sodium carboxymethylcellulose.

This filter material was applied to a closed seawater aquarium system with serious pollution and high aquaculture density. Before the application of this filter material, the water quality was: COD=533.4 mg/L, ammonia nitrogen=13.3 mg/L, nitrate=73.1 mg/L, nitrite=0.58 mg/L, dissolved oxygen=3.8 mg/L, bacteria content=$7\times10^7$/mL, pH=6.3.

This filter material was directly placed in the water body of the aquarium (the mass of this filter material:the volume of the water body=1:20 g/mL). After treating with this filter material for 24 h, the water quality was: COD=78.1 mg/L, ammonia nitrogen=5.2 mg/L, nitrate=47.8 mg/L, nitrite=0.3 mg/L, dissolved oxygen=4.4 mg/L, bacteria content=$2\times10^3$/mL, pH=6.8. After treating for 48 h, the water quality was: COD=33 mg/L, ammonia nitrogen=2.5 mg/L, nitrate=20.3 mg/L, nitrite=0.15 mg/L, dissolved oxygen=5 mg/L, bacteria content=$1.5\times10^2$/mL, pH=7.

In-situ treatment of water body in an aquarium.

4 groups of aquariums without filters were selected. Each group contained 15 L of freshwater. In each group, 5 healthy cyprinoids of 20-25 cm in length were normally fed with a same amount of feedstuff every day. The 4 groups of aquariums were treated as follows at the beginning of the experiment.

Experiment group 1: no treatment was performed.

Experiment group 2: a commercially available aquaculture filter material—active carbon (active carbon particles with a diameter of 1 mm) was placed in the aquarium.

Experiment group 3: a commercially available aquaculture filter material—biosphere (containing nitrifying bacteria) was placed in the aquarium.

Experiment group 4: the filter material of Example 1 of the present invention was placed in the aquarium.

The filter material of all of the above experiment groups were placed in filter cartridges of the same type, the ratio of the mass of the used filter material to the total volume of water was 750 g:15 L, and the filter cartridges containing the filter materials were placed in the water body of the aquariums. The filter cartridges were connected to air pumps, so that water was suction-filtered through the filter cartridges of these groups and the filtered water was returned to the aquarium, repeating this cycle.

Figure 2:
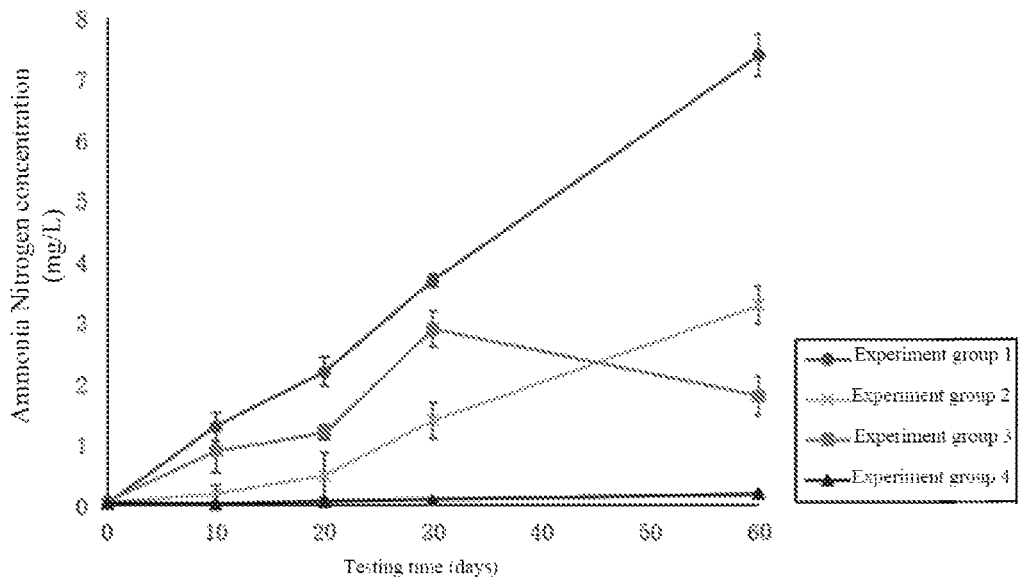
FIG. 2 is a graph showing changes in ammonia nitrogen concentration of water body over time in a process of treating an aquarium with different filter materials.
Figure 3:
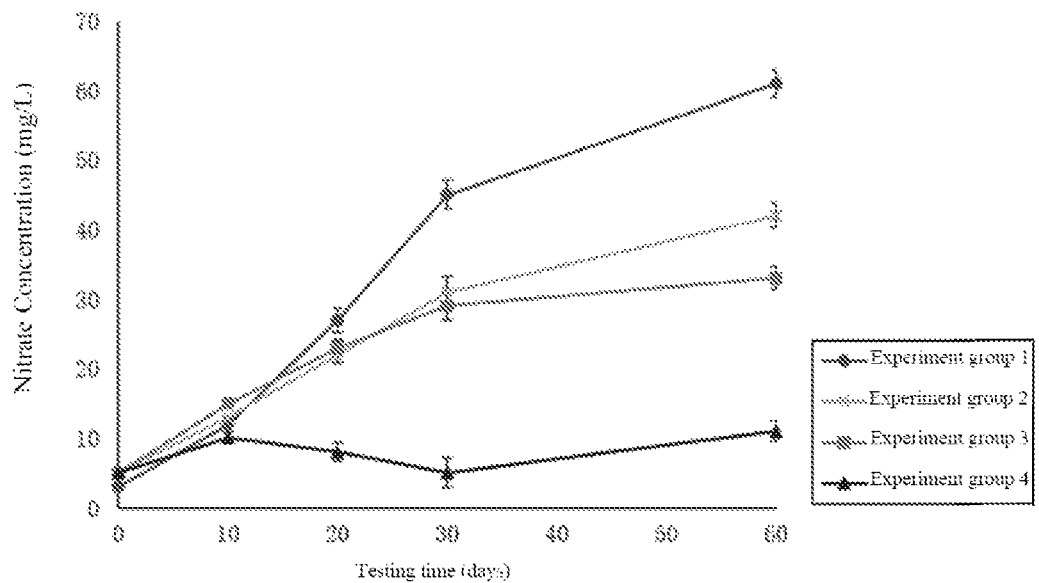
FIG. 3 is a graph showing changes in nitrate concentration of water body over time in a process of treating an aquarium with different filter materials.
Figure 4:
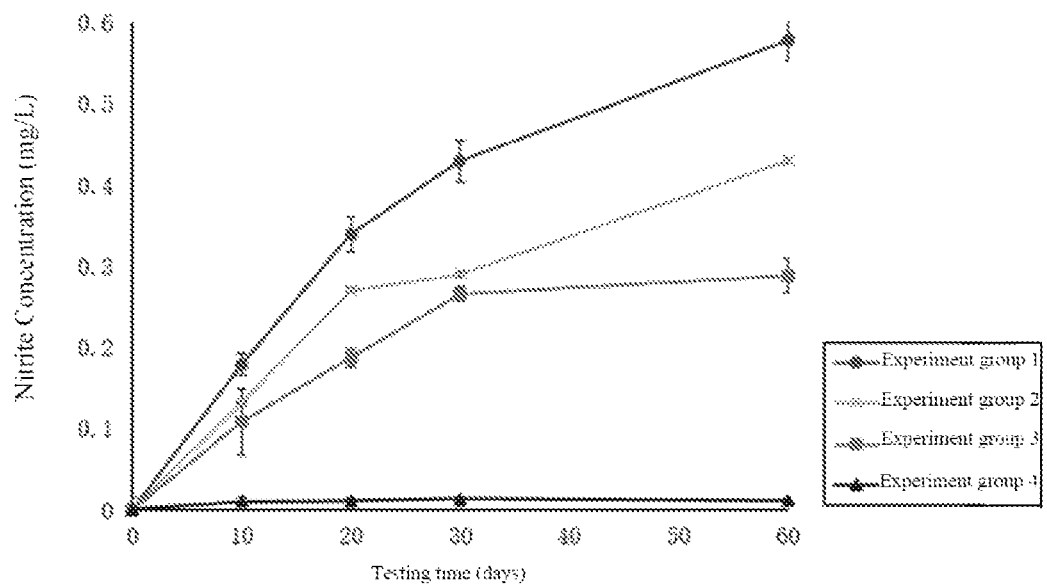
FIG. 4 is a graph showing changes in nitrite concentration of water body over time in a process of treating an aquarium with different filter materials.
Figure 5:
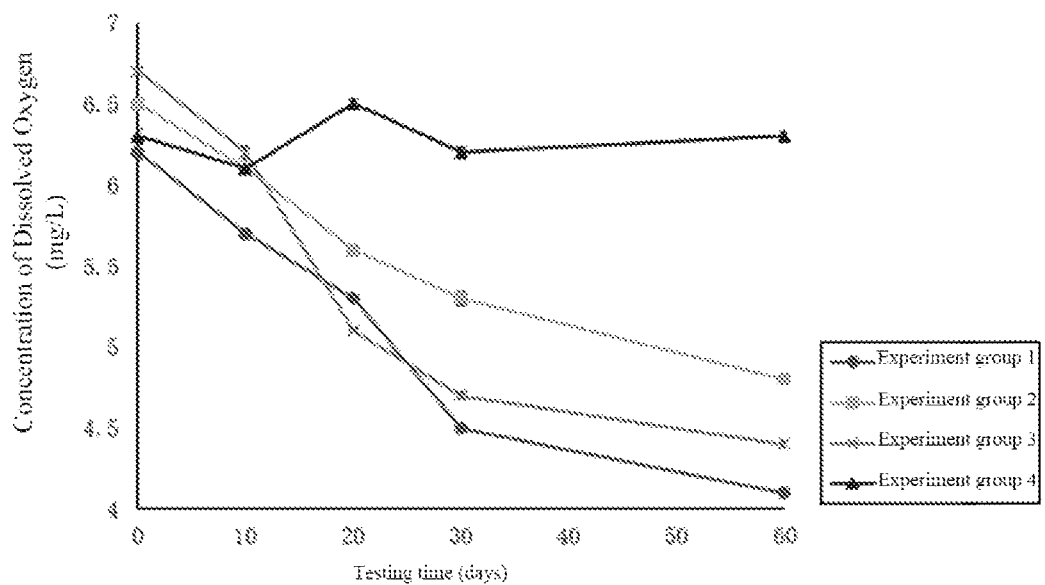
FIG. 5 is a graph showing changes in dissolved oxygen concentration of water body over time in a process of treating an aquarium with different filter materials.
Figure 6:
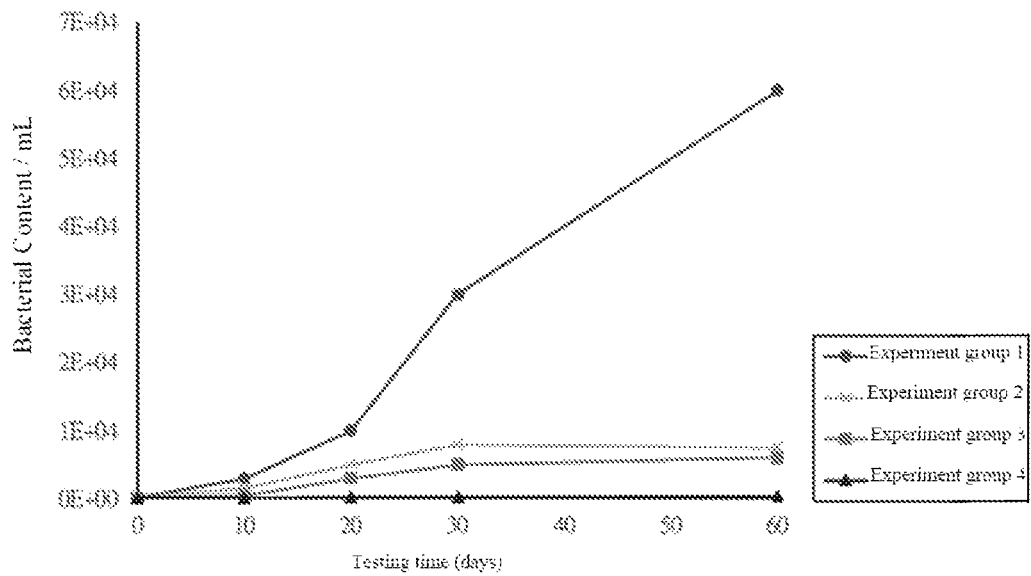
FIG. 6 is a graph showing changes in bacterial content of water body over time in a process of treating an aquarium with different filter materials.
Figure 7:
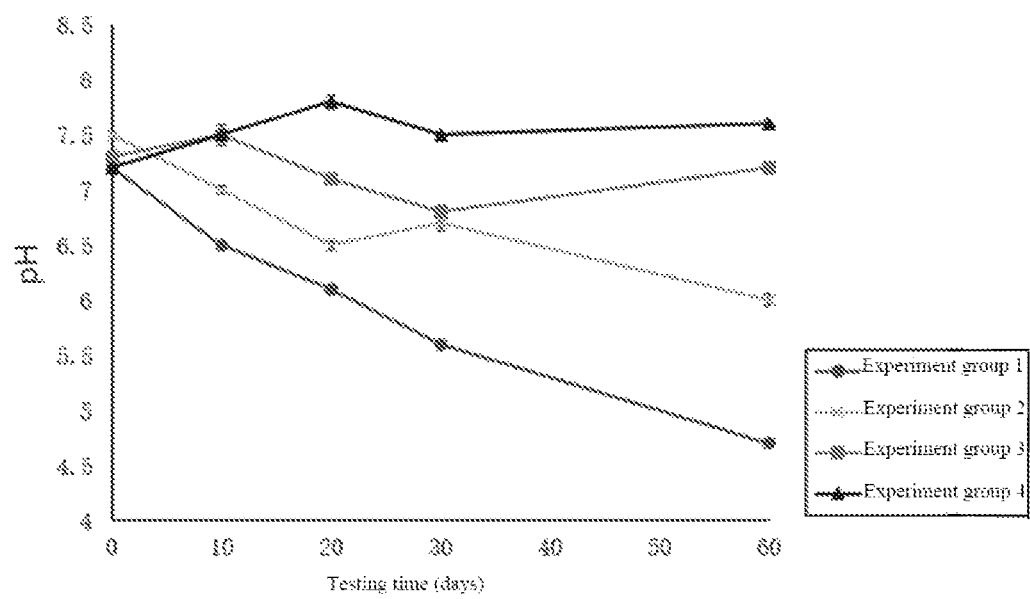
FIG. 7 is a graph showing changes in pH of water body over time in a process of treating an aquarium with different filter materials.

The concentrations of COD, ammonia nitrogen, nitrate, nitrite and dissolved oxygen, as well as bacteria contents and pH values in the water bodies were tested every 10 days. The results were shown in FIGS. 1-7.

As can be seen from FIGS. 1-7:

for experiment group 1 in which no treatment was performed, the water quality rapidly deteriorated after day 10 of the experimentation;

for experiment group 2, the commercially available aquaculture filter material-active carbon initially had good adsorption and treatment effect, but the treatment effect gradually deteriorated after 30 days along with the consumption of the filter material;

for experiment group 3, the commercially available aquaculture filter material—biosphere had less obvious treatment effect at an earlier stage because effective bacteria needs time to colonize and function, and had various treatment effects at later stage depending on the colonization and water quality;

for experimental group 4, the filter material of Example 1 of the present invention had effects immediately when the filter material was placed in the water, it decomposed pollutants and harmful bacteria in the water, maintained excellent water quality, and kept stable function for a long time along with the peeling and renewal of the surface of the filter material.

What is claimed is:

1. A filter material for a culture system, comprising the following components: an anode material which is an active metal, and a cathode material which is an inactive metal or a conductive non-metal;

wherein the filter material further comprises at least one of a catalyst and an acidifying agent;

wherein the catalyst is at least one selected from calcium peroxide, calcium oxide, calcium carbonate, calcium hydroxide, and silicon dioxide; and wherein the acidifying agent is at least one selected from phosphoric acid, malic acid, citric acid, fumaric acid, lactic acid, formic acid, acetic acid, propionic acid, butyric acid, and sorbic acid.

2. The filter material according to claim 1, wherein the filter material further comprises a binder.

3. The filter material according to claim 2, wherein the binder is at least one material selected from clay, sodium silicate, polyvinyl alcohol, sodium carboxymethylcellulose and bentonite.

4. The filter material according to claim 2, wherein, in the filter material, a mass percentage of the binder is 2-40%.

5. The filter material according to claim 1, wherein, in the filter material, a mass percentage of the anode material is 26-65%, and a mass percentage of the cathode material is 15-50%.

6. The filter material according to claim 5, wherein the anode material is at least one material selected from iron, aluminum, zinc, copper, platinum and gold.

7. The filter material according to claim 5, wherein the cathode material is at least one selected from carbon and manganese.

8. The filter material according to claim 1, wherein, if the filter material comprises a catalyst, in the filter material, a mass percentage of the catalyst is 1-20%, and if the filter material comprises an acidifying agent, a mass percentage of the acidifying agent is 0.05-20%.

9. The filter material according to claim 8, wherein, if the filter material comprises an acidifying agent, the filter material further comprises silicon dioxide and a sustained-release material.

10. The filter material according to claim 9, wherein the sustained-release material is at least one material selected from ethyl cellulose, hydroxypropyl methyl cellulose, acrylic resin, shellac, sodium alginate, maltodextrin, modified starch, stearic acid, magnesium stearate, sodium carboxymethylcellulose and xanthan gum.

11. The filter material according to claim 9, wherein the mass ratio of the acidifying agent:silicon dioxide:the sustained-release material is 1:0.1-0.5:0.3-1, and wherein the sustained-release material is a macromolecular compound.

12. The filter material according to claim 1, wherein, if the filter material comprises an acidifying agent, the filter material further comprises silicon dioxide and a sustained-release material.

13. The filter material according to claim 12, wherein the sustained-release material is at least one material selected from ethyl cellulose, hydroxypropyl methyl cellulose, acrylic resin, shellac, sodium alginate, maltodextrin, modified starch, stearic acid, magnesium stearate, sodium carboxymethylcellulose and xanthan gum.

14. The filter material according to claim 12, wherein the mass ratio of the acidifying agent:silicon dioxide:the sustained-release material is 1:0.1-0.5:0.3-1, and wherein the sustained-release material is a macromolecular compound.

15. The filter material according to claim 1, wherein the anode material is at least one material selected from iron, aluminum, zinc, copper, platinum and gold.

16. The filter material according to claim 1, wherein the cathode material is at least one selected from carbon and manganese.

\* \* \* \* \*